United States Patent
Wilyman

[11] Patent Number: 5,373,974
[45] Date of Patent: Dec. 20, 1994

[54] DROPLET DISPENSER

[75] Inventor: Peter R. Wilyman, Marlow, Great Britain

[73] Assignee: Air Products and Chemicals, Inc., Allentown, Pa.

[21] Appl. No.: 815,655

[22] Filed: Dec. 31, 1991

[30] Foreign Application Priority Data

Dec. 21, 1990 [GB] United Kingdom ............... 9027936

[51] Int. Cl.⁵ .............................................. G01F 11/20
[52] U.S. Cl. .................................. 222/330; 222/414
[58] Field of Search ............... 222/64, 185, 233, 235, 222/236, 238, 330, 410, 414, 420, 478; 425/209; 239/218.5, 324, 380; 198/550.01; 366/52, 29, 132, 134, 194, 196

[56] References Cited

U.S. PATENT DOCUMENTS

| | | | |
|---|---|---|---|
| 1,397,658 | 11/1921 | Rasmussen | 118/24 |
| 2,604,106 | 7/1952 | Carlstedt | 366/196 |
| 2,692,705 | 10/1954 | Marihart | 222/414 |
| 3,004,513 | 10/1961 | Matthews | 118/2 |
| 3,259,374 | 7/1966 | Doebl et al. | 366/194 |
| 3,807,701 | 4/1974 | Reid et al. | 366/132 |
| 4,289,026 | 9/1981 | Neuman | 222/64 |
| 4,597,358 | 7/1986 | Aitken | 222/333 |
| 4,767,030 | 8/1988 | Larson | 222/238 |
| 4,776,497 | 10/1988 | Hayashi et al. | 222/235 |

FOREIGN PATENT DOCUMENTS

| | | | |
|---|---|---|---|
| 3426974 | 1/1986 | Germany . | |
| 508455 | 1/1955 | Italy | 425/209 |
| 624773 | 9/1961 | Italy | 222/330 |

*Primary Examiner*—Andres Kashnikow
*Assistant Examiner*—Philippe Derakshani
*Attorney, Agent, or Firm*—James C. Simmons

[57] ABSTRACT

A droplet dispenser for pasty material, for example a puree, comprises a reservoir having a multiplicity of dispenser tubes. A rotor having blades rotates in the pasty material which is kept at a constant level. The tips of the blades do not touch the inlets of the dispenser tubes but pass a certain distance therefrom which is typically from 20 to 30 times the maximum dimension of the particles in the pasty material. Typically, the rotor is rotated at from 20 to 50 rpm.

14 Claims, 2 Drawing Sheets

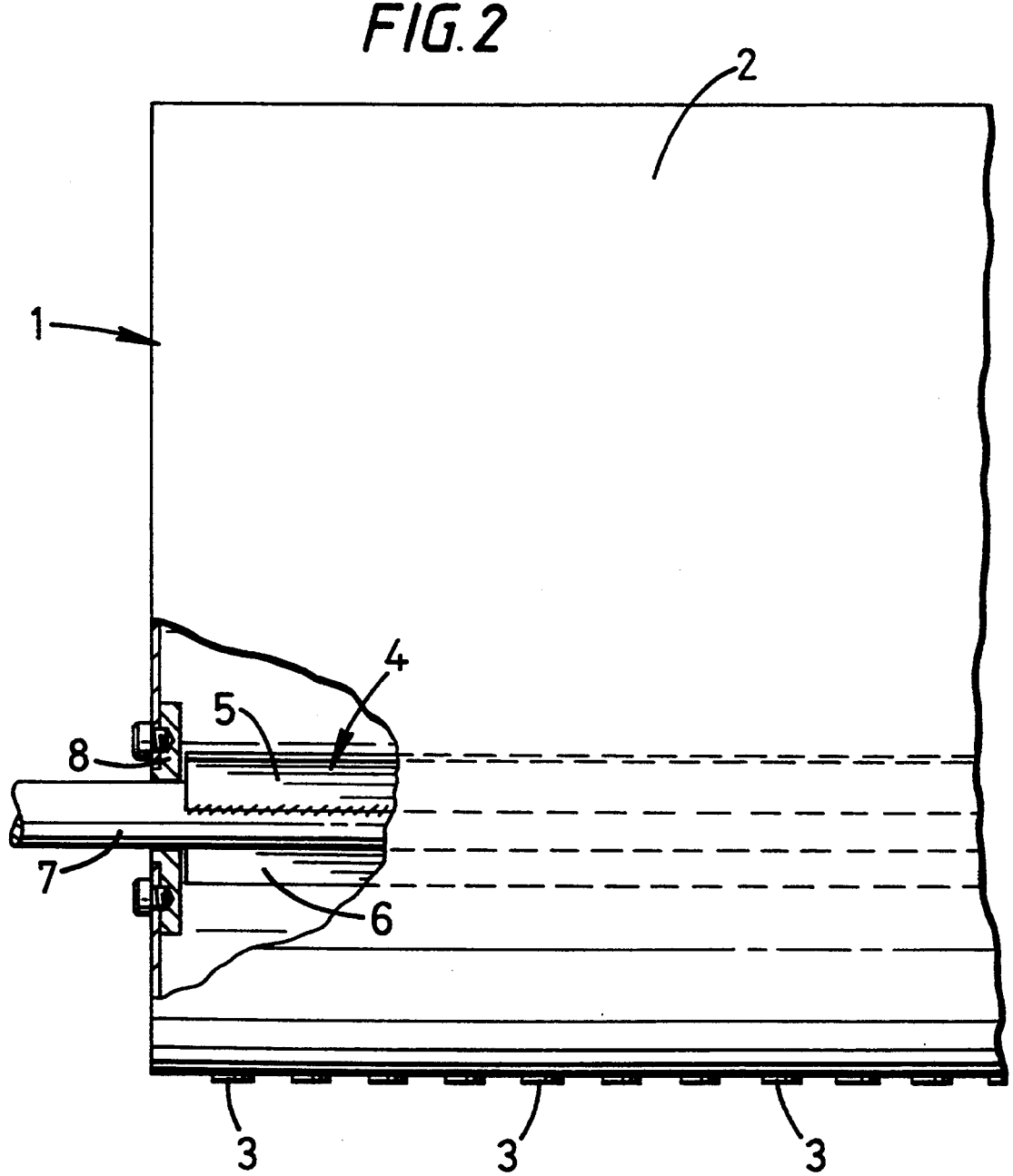

5,373,974

DROPLET DISPENSER

BACKGROUND OF THE INVENTION

This invention relates to a droplet dispenser and, more particularly but not exclusively, to a droplet dispenser for dispensing droplets of liquid and pasty material and to a method of dispensing droplets of pasty material.

In EP-A-0 332 287 we have described a freezer comprising a rotating drum having a cold outer surface on the top of which are deposited individual droplets of liquid or pasty material, The droplets freeze as the drum rotates and fall off the drum to form an attractive granular product.

In order to optimise this system the droplet dispenser, which comprises a reservoir with one or more dispenser tubes, should produce continuous, uninterrupted streams of separate and discrete droplets. Whilst this is relatively easy to achieve with homogeneous liquids it is difficult to achieve with pasty materials comprising small particles in a more or less viscous liquid, for example a puree such as onion puree, garlic puree, vegetable puree and fruit puree; baby food; mint sauce and horseradish sauce. Typically, the particles in these substances have a maximum dimension of 1 mm.

The problem which arises with these pasty materials is that the particles tend to block the dispenser tubes with the result that the frequency of the droplets decreases and can, in some cases, stop altogether.

SUMMARY OF THE INVENTION

Our initial approach to this problem was to arrange for metal prongs to periodically be lowered through the dispenser tubes to remove any accumulated paste. However, this was unsatisfactory for several reasons, in particular, the flow of droplets is disturbed each time the prongs are lowered and the prong reciprocating mechanism is clumsy and not easy to clean because of the relatively high number of pivoting connections.

A second approach was to make the lower portion of the reservoir semi-circular and to rotate a blade against the inside of the reservoir to continuously scrape any particles from the wall of the reservoir. This approach again proved unsuccessful because the stream of droplets was not produced at a constant rate.

The solution to this problem, or at least a very considerable improvement on our previous approaches, was to rotate a blade adjacent, but not touching, the inlet of the dispenser tube.

BRIEF DESCRIPTION OF THE DRAWING

FIG. 2 is a side elevation of a part of the droplet dispenser with part cut-away to show the rotor.

DETAILED DESCRIPTION OF THE INVENTION

Figure 1:
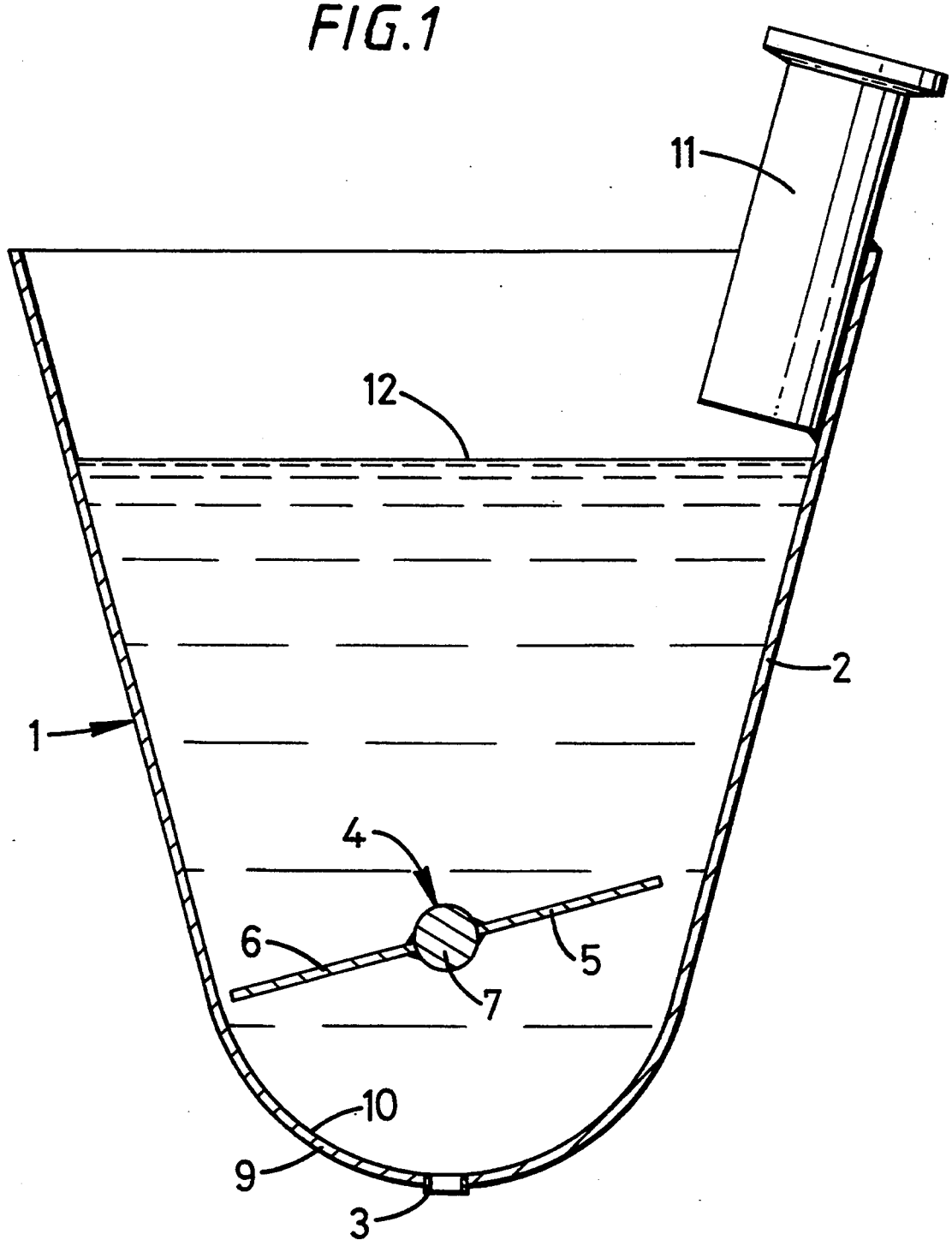
FIG. 1 is a cross-section through a droplet dispenser in accord with the invention.

According to the present invention there is provided a droplet dispenser comprising a reservoir for liquid and/or pasty products and at least one dispenser tube having an inlet opening into said reservoir, wherein said reservoir is provided with a rotor having a blade which, on rotation passes adjacent, but does not touch, the inlet of said dispenser tube.

The rotor may be arranged to rotate about a horizontal axis, a vertical axis or any axis therebetween. However, it is preferred that the rotor is arranged to rotate about a generally horizontal axis.

Preferably, the inner surface of the reservoir adjacent the inlet of the dispenser tube is shaped so that the minimum distance between the wall and the radial extremity of the blade of the rotor as it rotates is substantially constant. Thus, in a particularly advantageous embodiment the rotor is arranged to rotate about a generally horizontal axis and the lower portion of the reservoir is of arcuate, preferably semi-circular, cross-section.

Advantageously, for reasons of hygiene, the inlet of the dispenser tube is located at the lowermost portion of the reservoir.

Preferably, a plurality of dispenser tubes will be mounted on a single reservoir so that a plurality of streams of droplets can be simultaneously administered to a surface.

Preferably, the droplet dispenser will also be provided with means to control the rotational speed of the rotor, for example from 0 to 100 rpm, preferably from 20 to 50 rpm and advantageously from 25 to 30 rpm.

The minimum distance between the inlet of the dispenser tube and the blade(s) passing thereby will depend on the size of the particles in the particulate material and the speed of rotation of the rotor. As a first approximation it is preferred to use a distance which is from 5 to 25 and preferably from 10 to 15 times the maximum dimension of the particles. For a puree having a maximum particle size of about 1 mm the distance should be about 13 mm.

The present invention also provides a method of dispensing droplets of pasty material, wherein said method comprises the step of admitting pasty material to the reservoir of a droplet dispenser in accordance with the invention and rotating the rotor therof.

Preferably, the pasty material is selected from the group consisting of a puree, baby food and sauces, for example mint sauce and horseradish sauce, bolognese sauce and bonne femme sauce, and custard.

Advantageously, the rotor is rotated at from 10 to 100 rpm, preferably 20 to 50 rpm and advantageously from 25 to 30 rpm.

Preferably, said method includes the step of maintaining the level of pasty material in the reservoir substantially constant.

For a better understanding of the present invention reference will now be made, by way of example, to the accompanying drawings, in which:

FIG. 1 is a cross-section through a droplet dispenser in accordance with the invention; and FIG. 2 is a side elevation of part of the droplet dispenser with part cut-away to show the rotor.

Referring to the drawings, there is shown a droplet dispenser which is generally identified by reference numeral 1. The droplet dispenser 1 comprises a reservoir 2 and a plurality of dispenser tubes 3, each of which is approximately 2 mm in depth and 5 mm in internal diameter.

A rotor 4 is mounted for rotation about a generally horizontal axis. The rotor 4 comprises two blades 5 and 6 which are welded on a shaft 7 which is rotatably mounted in bearings at the ends of the droplet dispenser 1. One such bearing 8 is shown in FIG. 2.

It will be noted from FIG. 1 that the lower portion 9 of the reservoir 2 is of semi-circular cross-section and, most importantly, the radial extremity of the blades 5 and 6 is spaced from the inner surface 10 of the lower portion 9. In the embodiment shown the overall diameter of the rotor 4 is 50 mm whilst the clearance between the radial extremity of the blade 6 and the inner surface 10 is approximately 13 mm.

A liquid level controller (not shown) is provided to maintain the level of pasty material in the reservoir 2 substantially constant and a vent (not shown) is provided which connects the space between the pasty material and the top of the reservoir 2 to atmospheric pressure.

In use, a puree of garlic is prepared in the usual manner. The puree contains a multiplicity of particles of garlic having a maximum dimension of about 1 mm.

Rotor 4 is first rotated at about 25 rpm and the puree is introduced into the reservoir 2 through inlet pipe 11 until it reaches level 12. The liquid level controller (not shown) thereafter operates to maintain the level of puree in the reservoir 2 substantially constant by replenishing the reservoir 2 with sufficient puree to compensate for the puree which leaves the droplet dispenser 1 through dispenser tubes 3.

The optimum speed of the rotor 4 is determined by trial and error. If the speed is too low then puree obstructs the dispenser tubes 3. In contrast if the speed of the rotor 4 is too high the puree runs out of dispenser tubes 3 too fast.

The optimum speed of rotor 4 differs from pasty material to pasty material according to the size of the particles, the viscosity of the liquid and according to the height of the pasty material in the reservoir 2. However, we have found that 25 rpm is a good starting point.

The distance between the radial extremity of the blades 5 and 6 and the inner surface 10 of the lower portion 9 of the reservoir 2 is again subject to trial and error. If the extremities of the blades 5 and 6 are too close to the inner surface 10 then the flow of droplets becomes inconsistent. As the distance increases the flow of droplets becomes substantially uniform. However, if the distance is too great then pasty material starts blocking the dispenser tubes 3.

In the preferred embodiment hereinbefore described with particles having a maximum dimension of about 1 mm the optimum distance was around 13 mm. At 25 mm the dispenser tubes 3 became obstructed almost as quickly as if the rotor 4 were not present.

Our tests have indicated that, as a first approximation, the distance between the radial extremities of the blades 5 and 6 and the inner wall 10 should be from 5 to 20 times the maximum dimension of the particles and preferable from 10 to 15 times the maximum dimension of the particles. In general, the more viscous the pasty material the greater the distance should be.

Various modifications to the embodiment described are envisaged, for example, the rotor could rotate about a vertical axis. In such an embodiment the reservoir, or at least the lower portion thereof, would preferably be of circular cross-section about a vertical axis with the base of the reservoir either horizontal or, preferably, slightly conical and converging downwardly to a dispenser tube located on the vertical axis. The radial extremities of the blades may touch the walls of the reservoir or may be arranged with a clearance similar to the clearance described above. However, it is essential that the lower surface of the blade does not touch the base of the reservoir in the vicinity of the inlet of the dispenser tube. Preferably, the lower edge of the rotor is spaced equidistant from the base of the reservoir with the same magnitude of clearance as hereinbefore described.

Whilst a simple two blade rotor has been shown and described, other forms of rotor may be used, for example a single blade rotor or a rotor having a blade with a tortuous path. A rotor with a clockwise thread extending from one end towards the middle of the rotor and an anti-clockwise thread extending from the other end of the rotor towards the middle may also be used. Such an arrangement may be desirable. to facilitate uniform distribution where the reservoir is provided with a multiplicity of dispenser tubes.

The dispenser tubes themselves will typically be from 1 mm to 5 mm in axial length and have a hole of from 1 mm to 7 mm in diameter therethrough. The diameter of the hole will vary according to the viscosity of the liquid but should be substantially greater than the maximum dimension of the particles. The hole will usually be of uniform diameter throughout although it may be nozzle shaped (i.e., converging or converging/diverging to facilitate the production of droplets).

Typically, a dispenser tube will dispense from 60 to 300 droplets per minute of garlic puree. Each droplet will typically have a volume of from 0.05 to 0.25 cc.

What is claimed is:

1. A droplet dispenser comprising a reservoir for liquid and/or pasty products containing small particles dispersed in said liquid or paste and at least one dispenser tube having an inlet opening into said reservoir, wherein said reservoir is provided with a rotor having a blade, said blade having an outer edge portion which, on rotation of said blade said outer edge portion passes adjacent, but does not touch, the inlet of said dispenser tube, said blade constructed and arranged so that clearance between the outer edge portion of said blade and the inlet is selected to be between 5 and 25 times the largest dimension of the particles contained in said liquid or pasty product.

2. A droplet dispenser as claimed in claim 1, wherein said rotor is arranged to rotate about a horizontal axis.

3. A droplet dispenser as claimed in claim 1, wherein an inner surface of the reservoir adjacent the inlet of the dispenser tube is shaped so that the minimum distance between the inlet and the outer edge portion of the blade of the rotor as it rotates is substantially constant.

4. A droplet dispenser as claimed in claim 3, wherein the lower portion of the reservoir is of arcuate cross-section.

5. A droplet dispenser as claimed in claim 4, wherein the lower portion of the reservoir is of semi-circular cross-section.

6. A droplet dispenser as claimed in claim 1, wherein the inlet of the dispenser tube is located at the lowermost portion of the reservoir.

7. A droplet dispenser as claimed in claim 1, including a plurality of dispenser tubes so that, in use, a plurality of streams of droplets can be simultaneously administered to a surface.

8. A droplet dispenser as claimed in claim 1, wherein the minimum distance between the inlet of the dispenser tube and the blade(s) passing thereby is from 10 to 15 times the maximum dimension of the particles.

9. A method of dispensing droplets of pasty material, wherein said method comprises the steps of admitting pasty material to the reservoir of a droplet dispenser comprising a reservoir for liquid and/or pasty products and at least one dispenser tube having an inlet opening into said reservoir, wherein said reservoir is provided with a rotor having a blade, rotating said rotor blade so that the outer edge portion of said rotor blade is spaced a distance of between 5 and 25 times the largest dimension of the particle contained in said liquid or paste from the inlet of said dispenser tube, and recovering droplets from said dispenser.

10. A method according to claim 9, wherein said pasty material is selected from the group consisting of a puree, baby food, sauces and custard.

11. A method according to claim 9, including the step of rotating said rotor at from 10 to 100 rpm.

12. A method according to claim 11, including the step of rotating said rotor at from 20 to 50 rpm.

13. A method according to claim 12, including the step of rotating said rotor at from 20 to 30 rpm.

14. A droplet dispenser comprising a reservoir for liquid and/or pasty products, said droplet dispenser comprising a plurality of dispenser tubes which, in use, simultaneously dispense a plurality of streams of droplets onto a surface, wherein each dispenser tube has an inlet which opens into a reservoir the lower portion of which is of substantially semi-circular cross-section, a rotor mounted for rotation about a substantially horizontal axis, said rotor having at least two blades which, on rotation of said rotor pass adjacent, but do not touch, the inlet of said dispenser tubes, the distance between the outer edge portions of said blades and the lower portion of said reservoir adjacent said inlets being substantially constant as said rotor is rotated and said distance being between 5 and 25 times the largest dimension of the particles contained in said liquid or pasty product.

* * * * *